United States Patent
Connor et al.

(10) Patent No.: US 7,518,606 B2
(45) Date of Patent: Apr. 14, 2009

(54) SYSTEM AND METHOD FOR GENERATING CURVED PIPE OBJECTS FOR COMPUTER AIDED DESIGN MODELS

(75) Inventors: Edward J. Connor, Manchester, NH (US); Anandaraja Devan, Manchester, NH (US); Michael C. Rogerson, Manchester, NH (US); Steve Milligan, Merrimack, NH (US); Craig Storms, Concord, NH (US); Michael A. Appolo, III, Derry, NH (US)

(73) Assignee: Autodesk, Inc., San Rafael, CA (US)

( * ) Notice: Subject to any disclaimer, the term of this patent is extended or adjusted under 35 U.S.C. 154(b) by 199 days.

(21) Appl. No.: 11/278,654

(22) Filed: Apr. 4, 2006

(65) Prior Publication Data

US 2007/0229508 A1 Oct. 4, 2007

(51) Int. Cl.
*G06T 15/00* (2006.01)
(52) U.S. Cl. .................. 345/420; 345/419; 345/428
(58) Field of Classification Search .............. 345/419, 345/420, 428
See application file for complete search history.

(56) References Cited

U.S. PATENT DOCUMENTS

| | | | |
|---|---|---|---|
| 4,872,105 A | 10/1989 | Mozayeny | |
| 5,006,991 A * | 4/1991 | Ohcoshi et al. | 700/178 |
| 5,740,341 A * | 4/1998 | Oota et al. | 345/420 |
| 5,856,828 A | 1/1999 | Letcher, Jr. | |
| 6,967,654 B2 | 11/2005 | Steed | |
| 2002/0032552 A1 | 3/2002 | Nishiyama et al. | |

OTHER PUBLICATIONS

Holzapfel, M. Software adds bends, helix, and wrappings to CAD: Software with the unwieldy moniker GW3D features lets users create complex curves and surfaces [online], presented Jul. 21, 2005 [retrieved Dec. 20, 2007]. Retrieved from the Internet: URL: http://machinedesign.com/ContentItem/60130/SoftwareaddsbendshelixandwrappinstoCAD. aspx (p. 1, para 1-7).
CAD/CAM Components, Inc. GW3D features Examples [online], 2005 [retrieved Dec. 20, 2007]. Retrieved from the Internet: URL: http://www.cadcamcompnents.com/index.cfm?fuseaction=examples.main#menus, Helix Solid.
El Dorado Software. Lines [online], presented Sep. 28, 1999 [retrieved Dec. 20, 2007]. Retrieved from the Internet: URL: <http://www.eldoradosoft.com/lines.htm>., Drawing Lines.

* cited by examiner

*Primary Examiner*—Phu K Nguyen
(74) *Attorney, Agent, or Firm*—Patterson & Sheridan, LLP

(57) ABSTRACT

One embodiment of the invention provides a method for generating a curved pipe object in a computer-aided design drawing where the geometry of a curved pipe object is generally represented as a segment of a helix. A user selects a curved pipe creation method and a set of geometric attributes from which the helix parameters may be determined. From the helix parameters, a display representation of the curved pipe object may then be generated and displayed in the CAD drawing.

24 Claims, 10 Drawing Sheets

SYSTEM AND METHOD FOR GENERATING CURVED PIPE OBJECTS FOR COMPUTER AIDED DESIGN MODELS

BACKGROUND OF THE INVENTION

1. Field of the Invention

The present invention generally relates to computer-aided design and, more specifically, to a system and method for generating curved pipe objects for computer-aided design models.

2. Description of the Related Art

The term computer-aided design (CAD) generally refers to a broad variety of computer-based tools used by architects, engineers, and other construction and design professionals. CAD applications may be used to construct computer models representing virtually any real-world construct. Currently, computer-aided design (CAD) applications allow a designer or engineer to compose graphical representations of utility networks. A user interacting with a CAD application may generate a model of a utility network by drawing simple two-dimensional (2D) objects to represent components such as pipes, conduits, manhole covers, etc. Common 2D drawing objects include simple lines and arcs, etc., which provide only a crude representation of the network parts and do not adequately portray the real-world parts. To modify the utility network represented by the 2D drawing objects, the designer or engineer may have to edit one or more of these lines and arcs individually.

One object commonly included in a CAD drawing of a utility network is that of a pipe. Generating objects to represent linear segments of pipe is relatively straightforward. For example, a user may specify a beginning and ending coordinate, along with a radial size of a desired pipe object, or a user may specify a beginning point, direction and length of a desired pipe object. Generating objects to represent segments of curved pipe, however, has proven to be more difficult. One approach has been to approximate a curved pipe objects by generating multiple, short linear pipe objects. One drawback to this approach, though, is that to edit the approximation, the user must edit each individual short segment. Moreover, some CAD applications are configured to perform sophisticated calculations or simulations based on a particular CAD drawing. For example, calculations such as flow rates and pressures may be performed using the parametric data of a CAD drawing. By representing a curved pipe in a CAD drawing using multiple segments, these types of calculations often become inaccurate and unreliable.

Accordingly, there remains a need in the art for a way to generate curved pipe objects for computer-aided design models of utility networks that is more efficient and accurate the prior art techniques.

SUMMARY OF THE INVENTION

Embodiments of the invention provide a method for generating curved pipe objects in a CAD drawing. Generally, embodiments of the invention represent the geometry of a curved pipe object as a segment of a helix. To generate a curved pipe object, a user selects a curved pipe creation method and a set of geometric attributes from which a set of helix parameters may be determined. From the helix parameters, a CAD application may be configured to generate a both 2D and 3D display representations of the curved pipe object.

A number of creation methods may be provided. Generally, each creation method allows the user to specify a different set of data from which the helix parameters may be determined. Typical creation methods include a three-points method; a radius, start point, and endpoint method; and a tangent to last pipe and endpoint method. Once specified a CAD application may be configured to generate a display representation of the curved pipe object. For example, in a plan view the CAD application may be configured to generate 2D line work representing the geometry of the curved pipe object. In a profile view, the CAD application may be configured to generate 2D line work representing a beginning and ending elevation of the curved pipe object. In an isometric or 3D view, the CAD application may be configured to generate a display representation of the curved pipe object by sweeping a cross-sectional shape of the curved pipe object along a helical path determined from the helix parameters.

Advantageously, embodiments of the present invention allow users to include parts in a CAD drawing that represent a curved pipe as a single unit. Thus, users may edit the single object representing the curved pipe instead of multiple segments of straight pipe approximating the curve geometry. Further, this allows a CAD application to provide more accurate simulations. Further, once generated, a curved pipe object may be manipulated using a variety of user selectable grips, simplifying both the design process and effort required to modify a curved pipe object included in a CAD drawing.

DETAILED DESCRIPTION OF THE PREFERRED EMBODIMENTS

Embodiments of the invention provide a system and method for users to generate objects in a CAD drawing to represent segments of curved pipe. Generally, embodiments of the invention allow a user to model segments of curved pipe without requiring the user to approximate the desired curve geometry from multiple segments of straight pipe. Instead, users create segments of curved pipe using a simple, yet flexible, workflow. To generate a curved pipe object, the user invokes a curved pipe creation tool that prompts the user to specify a curved pipe creation method. Based on the user's selection of a creation method, the CAD application prompts the user to specify parameters of the of the desired curved pipe segment. Once specified, the CAD application generates a display representation of the curved pipe in the CAD drawing.

In one embodiment, the CAD application represents the geometry of the curved pipe as a helix. That is, the geometry of the curved pipe is represented as a curve with a constant angle connecting a beginning elevation point and an ending elevation point. Representing the curved pipe object as a helical segment provides a simple and elegant solution for modeling segments of curved pipe in a CAD drawing. For example, to render a 3D or isometric view, the CAD application simply sweeps the cross section of the curved pipe along the path defined by the helix parameters. Further, once generated, the curved pipe object may be easily modified by adjusting the helix parameters. Doing so simplifies both the design process and the work required to modify a curved pipe object included in a CAD drawing.

Additionally, 2D and 3D views may be generated that include a display representation of the curved pipe, including various, plan, profile, and section views. Typically, general editing is performed in a plan view and elevation is edited in a profile view. However, one of skill in the art will recognize that embodiments of the invention may provide editing functions in a variety of other views.

Also, embodiments of the invention are described herein being used to model a surface water utility network using structure parts such as manholes, catch basins, and storm sewers connected by pipe parts, including segments of curved pipe. However, embodiments of the invention are not limited to modeling this type of utility network and may be extended to other utility networks. For example, embodiments of the invention may be adapted to model utility networks such as telecommunications networks, pipeline networks, power grid networks, etc.

Figure 1:
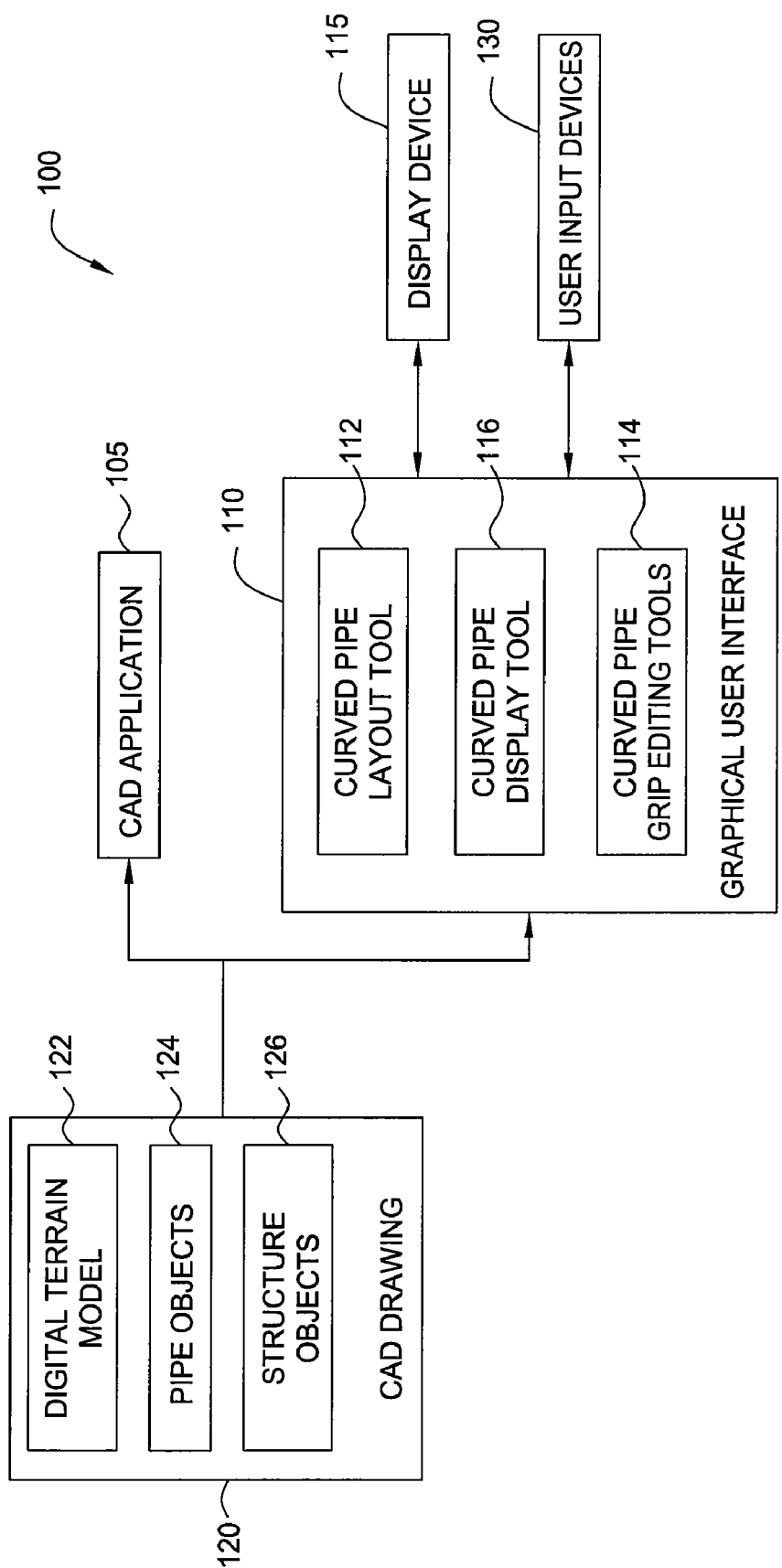
FIG. 1 is a block diagram illustrating a system used to compose a CAD drawing, according to one embodiment of the invention.

FIG. 1 is a block diagram illustrating a system 100 used to compose a CAD drawing 120, according to one embodiment of the invention. The components illustrated in system 100 include computer software applications that may be executed on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in system 100 may be software applications executing on distributed systems communicating over computer networks including local area networks or large, wide area networks, such as the Internet. For example, a graphical user interface 110 may include a software program executing on a client computer system communicating with a CAD application 105. Also, in one embodiment, CAD application 105 and graphical user interface 110 may be provided as an application program (or programs) stored on computer readable media such as a CD-ROM, DVD-ROM, flash memory module, or other tangible storage media.

As shown, the CAD system 100 includes, without limitation, CAD application 105, graphical user interface 110, CAD drawing 120, user input devices 130, and a display device 115. In one embodiment, CAD application 105 is a software application configured to allow a user interacting with GUI interface 110 to generate CAD drawing 120. Accordingly, CAD application 105 includes routines or instructions that allow users to create, edit, and save CAD drawing 120. Preferably, the Civil 3D® application program and associated utilities available from Autodesk®, Inc. may be used. Users may interact with GUI interface 110 and tools 112, 114, and 116 to create, display, and edit segments of curved pipe in CAD drawing 120. Data related to segments of curved pipe may be stored in CAD drawing 120. Typically, user input devices 130 include a mouse pointing device and a keyboard, and display device 115 is a CRT monitor or LCD display.

In one embodiment, GUI interface 110 provides tools used in creating curved pipe objects in CAD drawing 120. As shown, GUI interface 110 includes a curved pipe layout tool 112, curved pipe editing tools 114, and curved pipe display tool 116. Those, skilled in the art will recognize, however, that the tools of GUI interface 110 shown in FIG. 1 are simplified to highlight aspects of the present invention and that a typical CAD application 105 and GUI interface 110 typically include a broad variety of additional tools and features used to compose a CAD drawing 120.

Curved pipe layout tool 112 allows the user to generate a segment of curved pipe in CAD drawing 120. As described in greater detail herein, CAD application 105 may be configured to prompt the user to specify a set of data used by the CAD application to characterize the geometry of the desired curved pipe object. Curved pipe display tool 116 may be configured to generate a display representation of curved pipe segments depending on the view of the CAD drawing (i.e., a plan, profile, or isometric (3D) view). Once created, curved pipe editing tools 114 may be used to edit the properties of a segment of curved pipe in a CAD drawing.

As also shown, CAD drawing 120 includes a digital terrain model 122 pipe objects 124, and structure objects 126. Digital terrain model 122 represents a virtual three-dimensional space for composing a model of utility network. Typically, digital terrain model 122 provides a representation of the geography and terrain present at some real-world location. Digital terrain model 122 may include terrain geometry representing sections of both ground surfaces and sub-surfaces.

Generally, a utility network modeled by CAD drawing 120 may be composed from pipe objects 124 and structure objects 126. Pipe objects 124 are typically used to connect network parts in the model of a utility. Most often a pipe object connects two structure objects 126 or elements of a single structure. Structure objects 126 represent the engineering or structural components of a utility network. For example, common structures of a surface water utility network include manholes, catch basins, headwalls, end sections, covers, grates, gutters, storm drains and the like. Of course, depending on the type of utility network being modeled, different types of structure objects 126 and pipe objects 124 may be provided.

Figure 2:
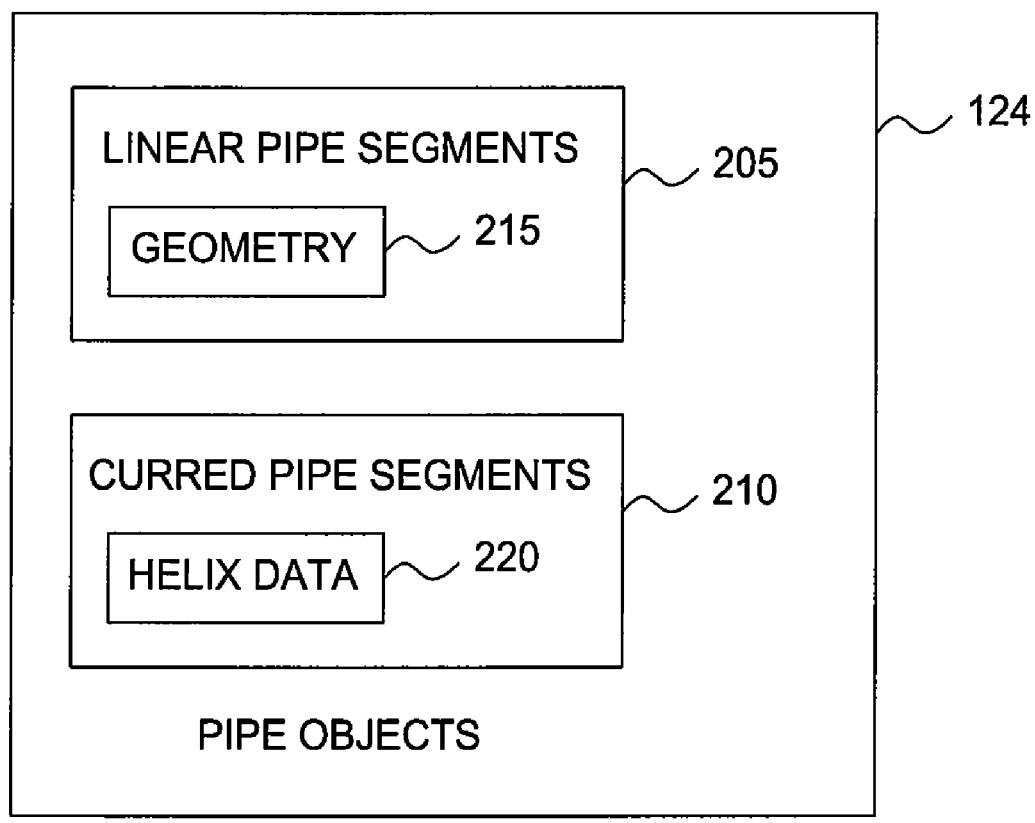
FIG. 2 is a block diagram further illustrating elements of a CAD drawing, according to one embodiment of the invention.

FIG. 2 is a block diagram further illustrating elements of CAD drawing 120, according to one embodiment of the invention. As shown, pipe objects 124 may include both linear pipe segments 205 and curved pipe segments 210. Linear pipe objects include geometry data 215. The geometry data 215 may indicate the beginning and ending coordinates of a particular pipe object 205 in CAD drawing 120, and may indicate connectivity with one or more structure objects 126 in CAD drawing 120. Curved pipe objects 210 include helix data 220. The helix data 220 may indicate the geometry of a curved pipe segment in CAD drawing 120. For example, in terms of a single parameter t, the geometry of a helix may be defined by the following equations:

$$x = p * \cos t$$

$y = q*\sin t$ $z = r*t$

In one embodiment, helix data 220 stores values for p, q, and r. By calculating (x,y,z) coordinate values, the geometry of a particular curved object may be fully characterized from these simple parameters. Persons skilled in the art will recognize, however, that helix data 220 may represent the geometry of a helix in a variety of ways. Additionally, pipe objects 124 may also include attributes specifying pipe type, size, construction material and the like.

Figure 3:
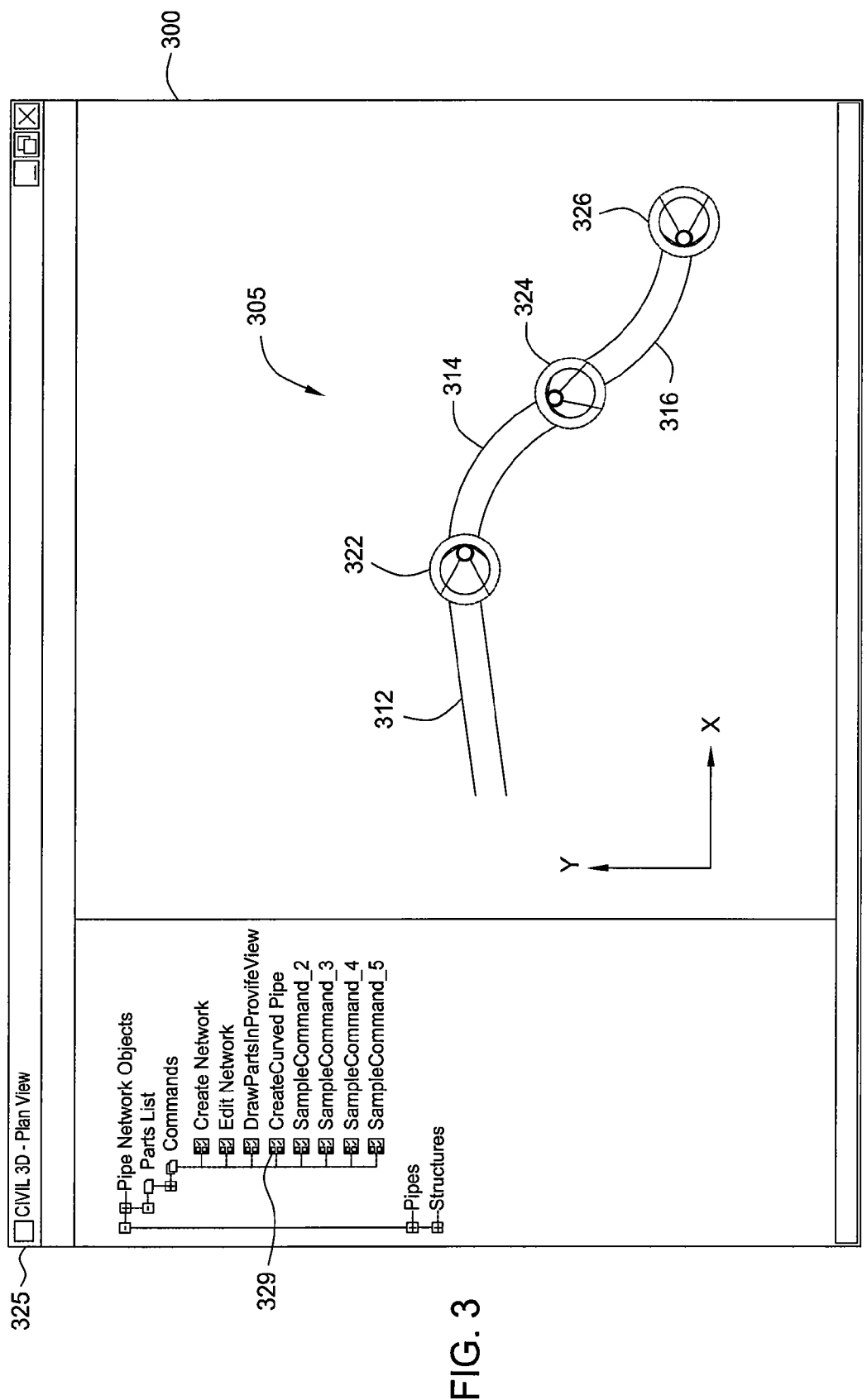
FIG. 3 illustrates a graphical user interface screen displaying a plan view of a utility network that includes curved pipe segments, according to one embodiment of the invention.
Figure 4:
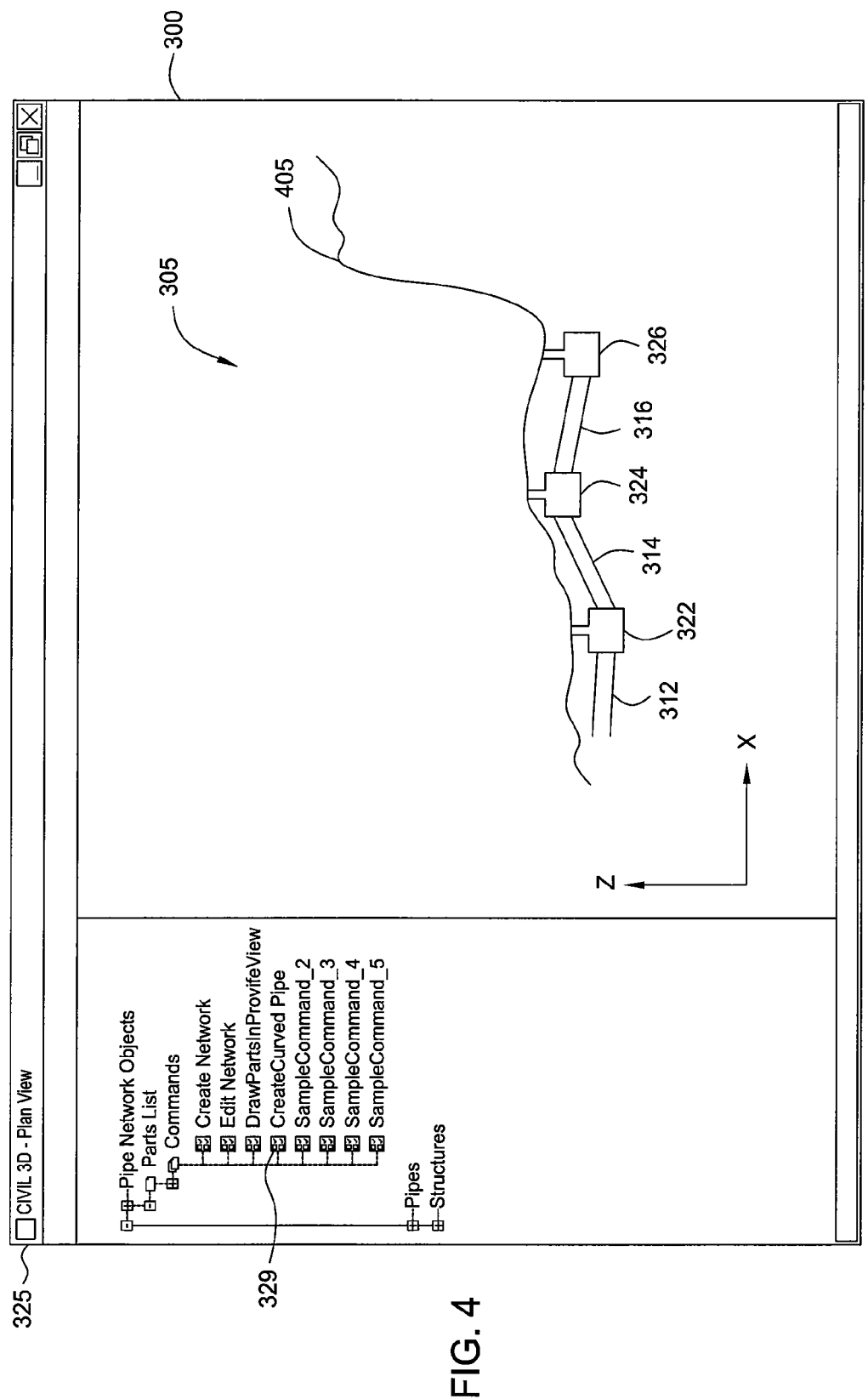
FIG. 4 illustrates a graphical user interface screen displaying a profile view of a utility network that includes curved pipe segments, according to one embodiment of the invention.
Figure 5:
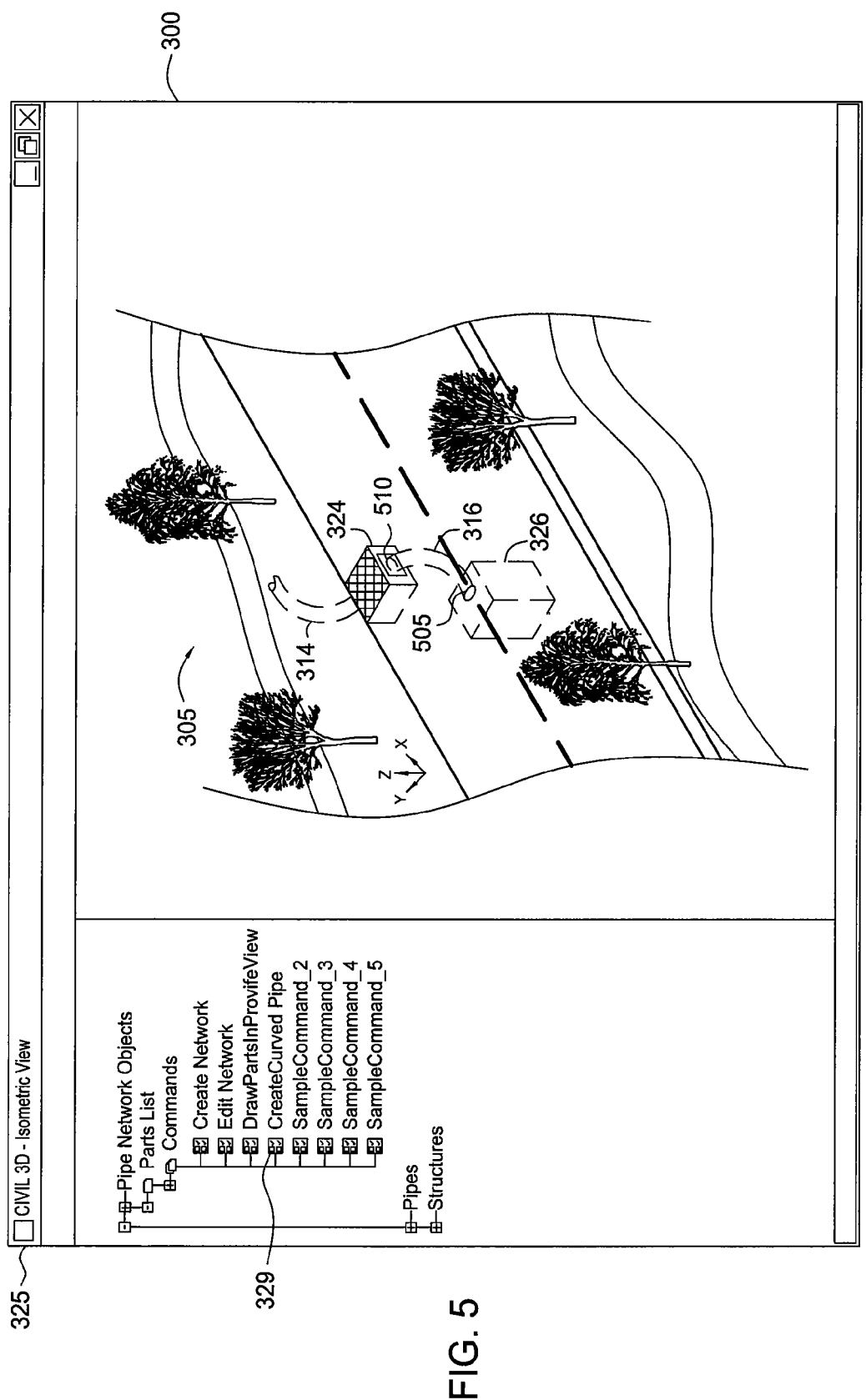
FIG. 5 illustrates a graphical user interface screen displaying an isometric view of a utility network that includes curved pipe segments, according to one embodiment of the invention.

FIGS. 3, 4 and 5, illustrate a series of exemplary GUI interface 110 displays rendering different views of CAD drawing 120. First, FIG. 3 illustrates a graphical user interface screen displaying a plan view of a utility network that includes curved pipe segments, according to one embodiment of the invention. As shown, view area 300 displays a portion of a utility network 305. Utility network 305 includes three structure objects 322, 324 and 326, connected by three pipe objects 312, 314 and 316. In this example, pipe object 312 illustrates an example of a linear pipe object 205, and pipe objects 314 and 316 illustrate examples of curved pipe objects 210.

FIG. 3 also shows interface area 325 used to invoke commands, such as a "create curved pipe" command 329. In one embodiment, users invoke curved pipe layout tool 112 by selecting command 329. Alternatively (or additionally), embodiments of the invention may include a command line interface or other graphical tools such as menu selections or buttons that allows users invoke curved pipe layout tool 112.

FIG. 4 illustrates a graphical user interface screen displaying a profile view of a utility network that includes curved pipe segments, according to one embodiment of the invention. Illustratively, the view area 300 shown in FIG. 4 has been transitioned to a profile view of the utility network 305. The profile view includes a ground surface 405 along with structure objects 322, 324, and 326, and pipe objects 312, 314 and 316. Note, in profile view, the view area 300 shows a display representation of curved pipe objects 314 and 316 using straight segments. This occurs in profile view, as curved pipe objects 314 and 326 may be rendered by using a display representation that connects the beginning and ending elevation coordinates of these pipe objects.

FIG. 5 illustrates a graphical user interface screen displaying an isometric view of a utility network that includes curved pipe segments, according to one embodiment of the invention. Illustratively, the view area 300 shown in FIG. 4 has been transitioned to an isometric view of the utility network 305. The isometric view includes structure objects 324 and 326, and the curved pipe objects 314 and 316. As shown, the isometric view illustrates both the curved geometry of curved pipe objects 314 and 316, as well as the difference in elevation from the beginning point 505 and ending point 510. In one embodiment, the display representation for pipe objects 314 and 316 is generated by sweeping a cross-sectional shape of a curved pipe object (e.g., curved pipe objects 314 and 316) along the path of a helix specified by helix data 220.

Figure 6:
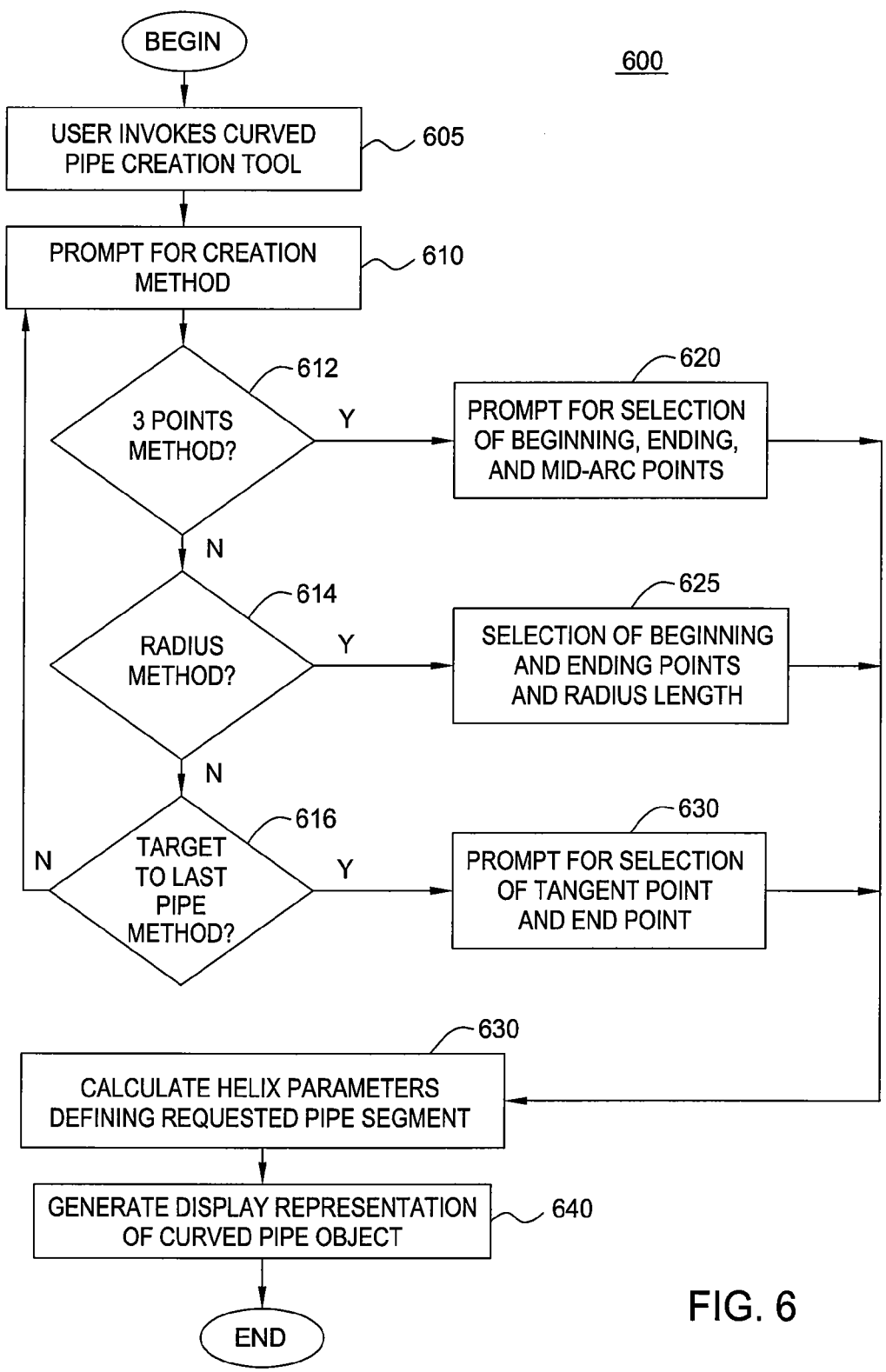
FIG. 6 illustrates a method for generating a curved pipe object in a CAD drawing, according to one embodiment of the invention.
Figure 7:
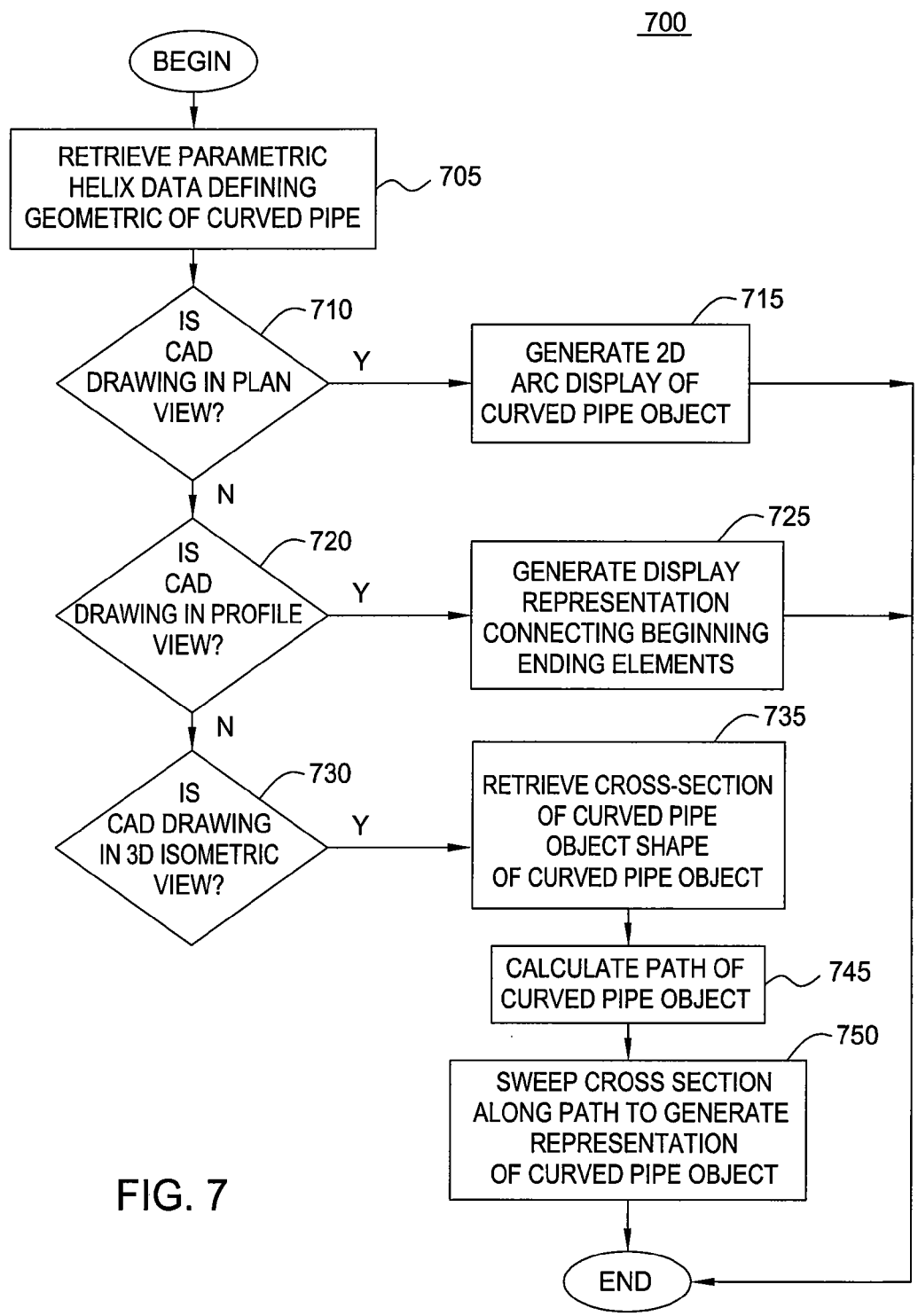
FIG. 7 illustrates a method for generating a display representation of a curved pipe object in a CAD drawing, according to one embodiment of the invention.
Figure 8:
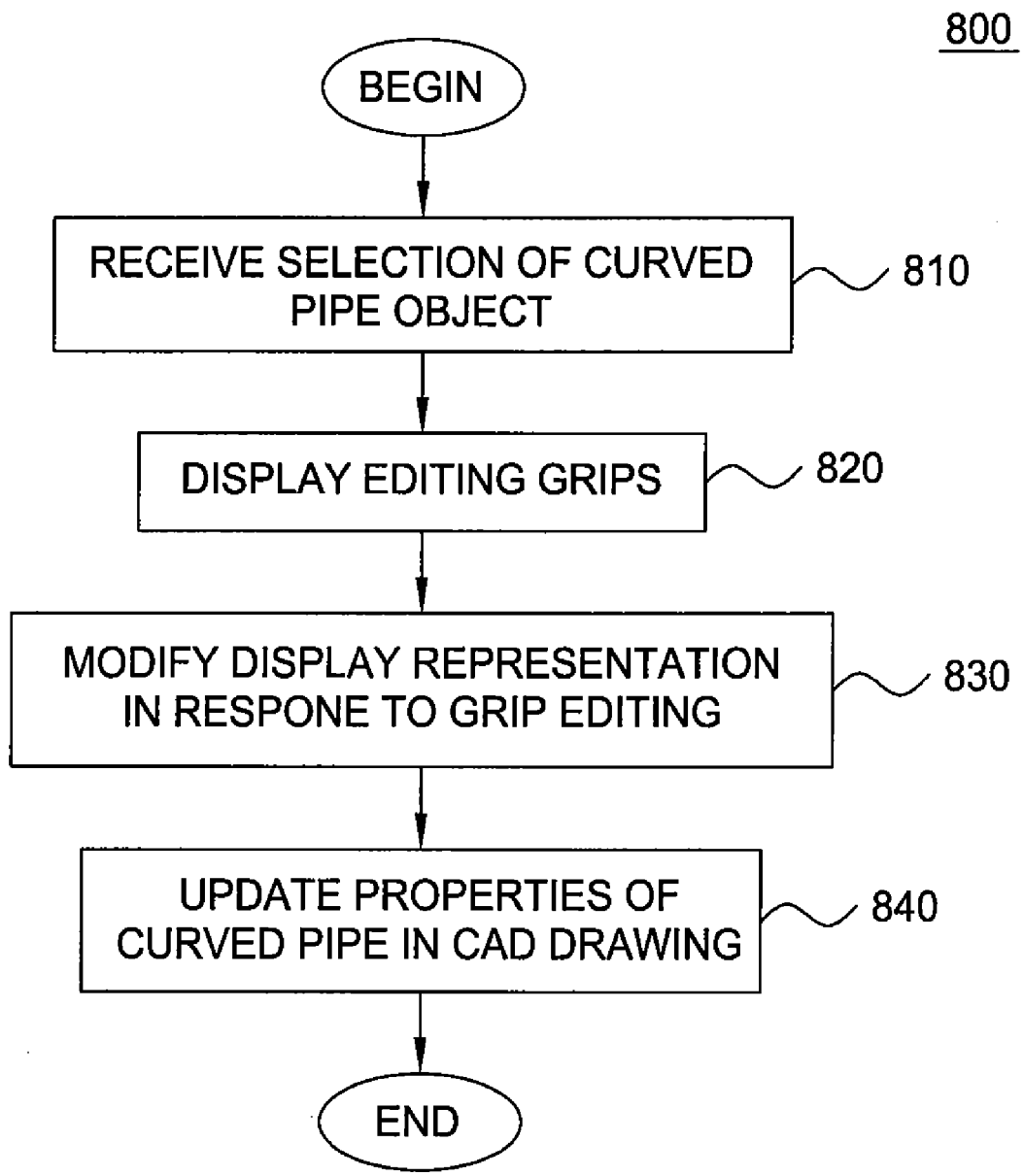
FIG. 8 illustrates a method for editing a curved pipe object in a CAD drawing, according to one embodiment of the invention.

FIGS. 6-8 illustrate methods for generating (FIG. 6), displaying (FIG. 7), and editing (FIG. 8) curved pipe objects in CAD drawing 120. Persons skilled in the art will understand that any system configured to perform the method steps shown in FIGS. 6-8, in any order, is within the scope of the present invention.

FIG. 6 illustrates a method for generating a curved pipe object in a CAD drawing 120, according to one embodiment of the invention. The method 600 beings at step 605 where the user invokes a curved pipe layout tool 112 (e.g., using the "create curved pipe" command 329 shown in FIG. 3). In response, at step 610, the CAD application 105 may be configured to prompt the user to specify a particular curved pipe creation method. In one embodiment, users may select from one of several creation methods, including a three-points method (step 612), a radius, start point, and endpoint method (step 614), and a tangent to last pipe and endpoint method (step 616). In each case, the creation method allows the user to specify different parameter values used to characterize the geometry of a desired curved pipe object.

If the user selects the three-points method, then the CAD application 105 may be configured to prompt the user to select three points within the digital terrain model 122 associated with CAD drawing 120. Specifically, the user may be prompted to select coordinates representing a beginning point, an ending point, and one point along the desired curve (step 620). From this information, the CAD application 105 calculates helix data 220 to represent the geometry of the requested curved pipe object (step 635) and generates a display representation of the curved pipe object (step 640).

If the user selects the radius, start point, and endpoint method, then the CAD application 105 may be configured to prompt the user to specify a radius and coordinates for the beginning and ending points for the curved pipe object being generated. From this information, the CAD application 105 calculates helix data 220 to represent the geometry of the requested curved pipe object (step 635) and generates a display representation of the curved pipe object (step 640).

If the user selects the tangent to last pipe and endpoint method, then the CAD application 105 may be configured to prompt the user to specify the desired pipe segment to use as the beginning point and to specify a coordinate for the ending point. From this information, the CAD application 105 calculates helix data 220 to represent the geometry of the requested curved pipe object (step 635) and generates a display representation of the curved pipe object (step 640).

FIG. 7 illustrates a method for generating a display representation of a curved pipe object 210 in a CAD drawing 120, according to one embodiment of the invention. The method 700 begins at step 705 where the CAD application 105 retrieves the parametric data for a curved pipe object in CAD drawing 120. Next, the CAD application 105 generates an appropriate display representation of the curved pipe object based on the view of the CAD drawing 120. For example, a display representation may be generated for a curved pipe object in a plan view (step 710), a profile view (step 720), or a 3D/isometric view (step 730).

If a plan view is being generated, then at step 715, the CAD application 105 generates a curved 2D arc representing the curved pipe. For example, FIG. 3 shows a display representation of curved pipe objects 314 and 316 composed from 2D line work to represent the curved geometry of these pipe objects. Alternatively, if a profile view is being generated, then at step 725, the CAD application 105 generates a display representation of the pipe object that shows the beginning and ending coordinates of the pipe object. For example, FIG. 4 shows a display representation of curved pipe objects 314 and 316 composed from 2D line work to connect the beginning and ending coordinates, based on the elevations of these points. Still alternatively, if a 3D/isometric view is being generated, then at step 735 the CAD application 105 retrieves a cross-sectional shape of the curved pipe object. At step 745, the CAD application 105 determines the path of the curved pipe object within a digital terrain model. In one embodiment, using helix data 220, CAD application 105 calculates an (x,y,z) coordinate according to the equations $x = p*\cos t$, y=q*sin t, and z=r*t, as described above. Once the path of the curved pipe object is determined, a 3D representation of the curved pipe object is generated by sweeping the cross sectional shape along the path defined by the helix data 220.

FIG. 8 illustrates a method for editing a curved pipe object 210 in a CAD drawing 120, according to one embodiment of the invention. In one embodiment, the method 800 beings at step 810 where the user selects a particular curved pipe object 210 in CAD drawing 120. In response, at step 820, the CAD application may be configured to display a set of one or more editing grips. As used herein, a grip is a graphical object that is part of the GUI interface 110 and displayed to the user on the display device 115. At step 820, the user may edit the selected curve pipe object by clicking on one of the grips, dragging the grip by moving the position of the mouse cursor, and releasing the grip at a desired position. At step 840, the CAD application 105 updates the helix data 220 to reflect any modifications made by the user interacting with one of the grips.

Figure 9A:
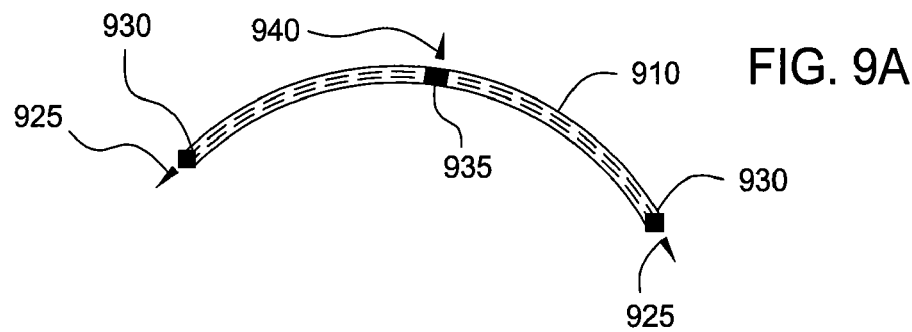
FIGS. 9A-9E illustrates a curved pipe object being manipulated using a variety of selectable grips, according to one embodiment of the invention.

FIGS. 9A-9E illustrates a curved pipe object 910 being manipulated using a variety of selectable grips, according to one embodiment of the invention. The curved pipe 910 in FIGS. 9A-9E is displayed in plan view. FIG. 9A illustrates curved pipe object 910 with several enabled grips. More specifically, curved pipe object 910 is shown with length grips 925 and endpoint grips 930, one at each end of curved pipe object 910. Also, curved pipe object 910 is shown with a midpoint grip 935 and a midpoint resize grip 940. FIGS. 9B-9E illustrate example operations on curved pipe object 910 using each of these grips.

Figure 9B:
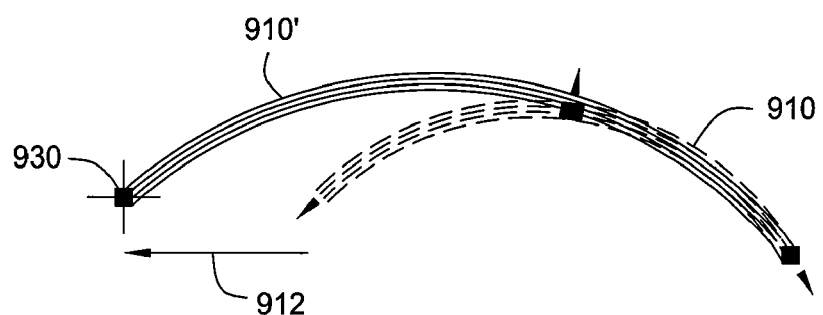

FIG. 9B illustrates curved pipe object 910 being grip edited using one of endpoint grips 930. As shown, endpoint grip 930 is being used to transform curved pipe object 910 to a modified curved pipe object 910'. To perform this transformation, the user selects endpoint grip 930 and drags it to a new position, as indicated by arrow 912. In response, the CAD application 105 updates the helix data 220 to reflect the new endpoint position.

Figure 9C:
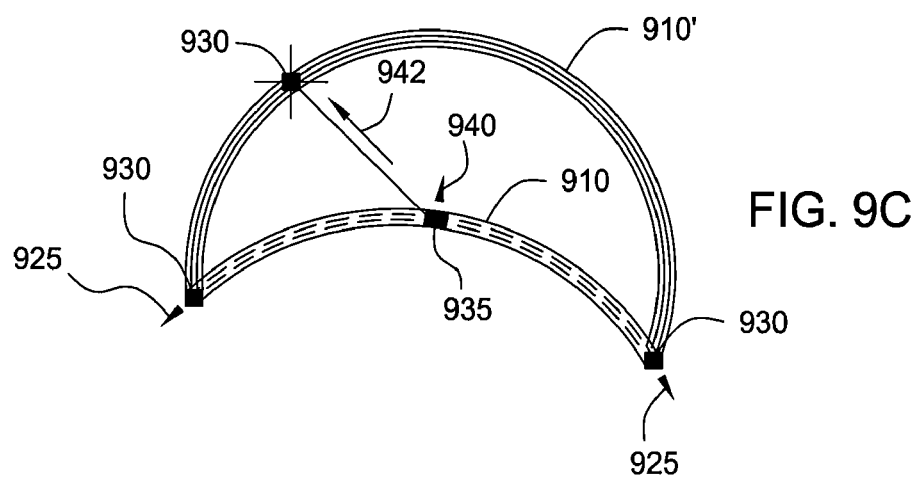

FIG. 9C illustrates the actions of a user interacting with a midpoint grip 940 to move the location of the midpoint of curved pipe 910. As shown, by dragging midpoint grip 940 to the position indicated by arrow 942, the user transforms curved pipe object 910 to a modified curved pipe object 910'. In response, CAD application 105 updates the helix data 220 to reflect the new midpoint position.

Figure 9D:
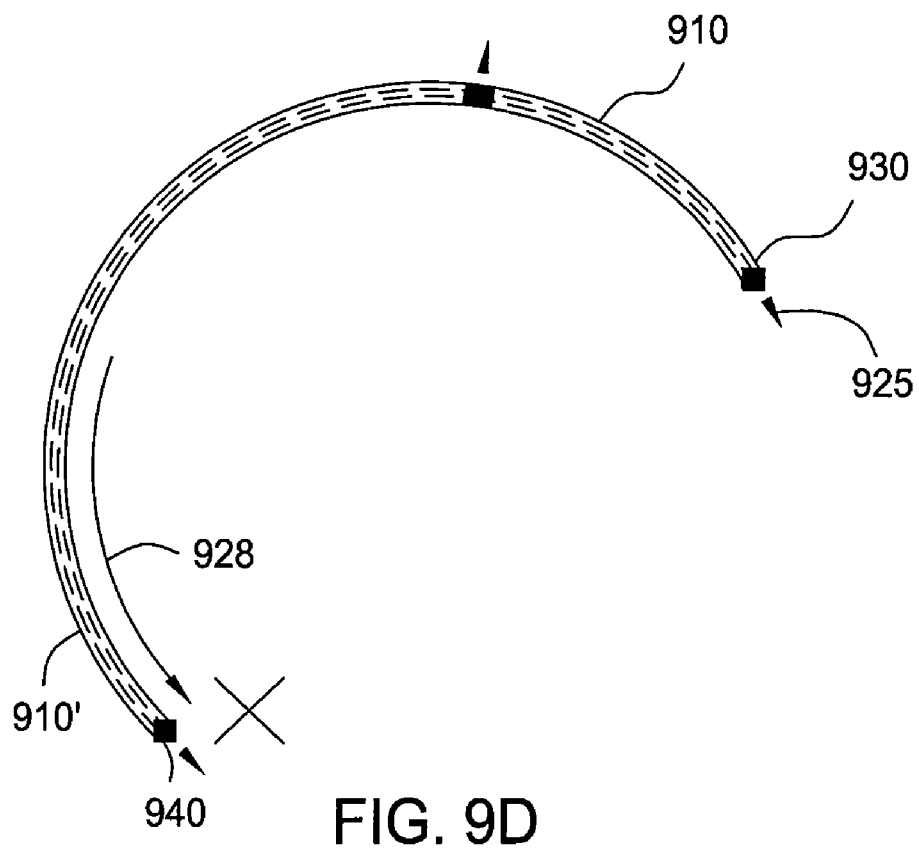

FIG. 9D illustrates the actions of a user interacting with a length grip 940 to modify the length of curved pipe 910. As shown, length grip 925 is being used to transform curved pipe object 910 to a modified curved pipe object. In one embodiment, length grip 940 allows the user to extend (or shorten) the length of pipe 910 by continuing to rotate the curved pipe about a center point (as shown by curved pipe extension 910' and arrow 928). As the user drafts the length grip 940, the displayed length of pipe 910 may be adjusted accordingly. Once the user modifies the curved pipe 910 to the desired length, CAD application 105 updates the helix data 220.

Figure 9E:
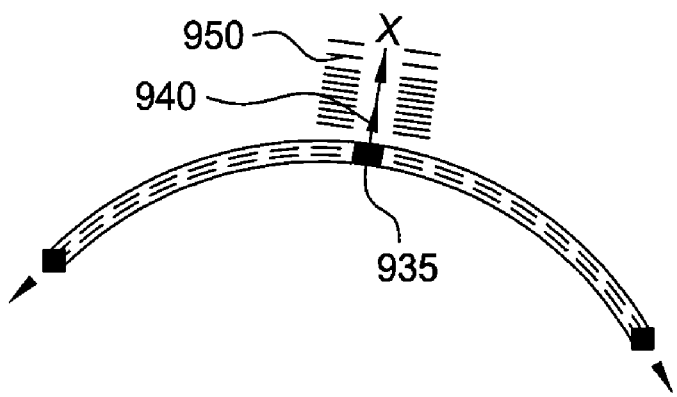

FIG. 9E illustrate the actions of a user interacting with a resize grip 940 to edit the diameter size of curved pipe 910. The size of the curved pipe 910 is changed in FIG. 9E using the resize grip 940. Note, the resize grip does not change the beginning ending, or midpoints of curved pipe 910, but allows the user to edit the diameter size of this pipe object. In addition, when changing the size of curved pipe 910, the cross-sectional shape used to generate a 3D representation of the curved pipe may be updated as well. When the user selects resize grip 940, hash marks 950 (or graduated scale) may be displayed. Each hash mark represents a different selectable diameter for curved pipe 910. In one embodiment, resize grip 940 may be configured to snap from one hash mark to the next. In other words, rather than move using a continuous motion, resize grip 940 may jump from one available pipe size to the next while being grip edited.

Advantageously, embodiments of the present invention allow users to include parts in a CAD drawing that represent a curved pipe as a single unit, as opposed to the prior art techniques of representing a curved pipe as a collection of smaller, straight pipe segments. Thus, relative to prior art teachings, the present invention simplifies both the design of curved pipe objects in CAD drawings as well as the process of editing and modifying these objects once they have been generated. Further, once generated, a curved pipe object may be easily manipulated using a variety of user selectable grips.

While the foregoing is directed to embodiments of the present invention, other and further embodiments of the invention may be devised without departing from the basic scope thereof, and the scope thereof is determined by the claims that follow.

What is claimed is:

1. A method for generating a curved pipe object in a computer-aided design (CAD) drawing created by a CAD device, the method comprising:
   receiving a user selection of one of a plurality of a curved pipe creation methods, wherein each curved pipe creation method allows the user to specify one or more parameters for characterizing the geometry of the curved pipe object;
   based on the selected curved pipe creation method, prompting the user to specify geometric attributes of the curved pipe object to be generated;
   from the geometric attributes of the curved pipe object, determining a collection of 3D helix parameters that represent the geometry of the curved pipe object in a 3D coordinate system; and
   generating a display representation of the curved pipe object using the 3D helix parameters in the CAD drawing.

2. The method of claim 1, wherein the curved pipe creation method is a three-points method, and wherein the geometric attributes comprise a beginning coordinate, an ending coordinate, and an arc coordinate for the curved pipe object to be generated.

3. The method of claim 1, wherein the curved pipe creation method is a radius, start point, and endpoint method, and wherein the geometric attributes comprise a beginning coordinate, an ending coordinate, and a radius length for the curved pipe object to be generated.

4. The method of claim 1, wherein the curved pipe creation method is a tangent to last pipe and endpoint method, and wherein the geometric attributes comprise an endpoint coordinate of a pipe object in the CAD drawing and an endpoint coordinate.

5. The method of claim 1, further comprising,
   enabling at least one grip associated with the curved pipe object;
   receiving a grip editing input from the user;
   generating a modified display representation of the curved pipe object; and
   updating the 3D helix parameters representing the geometry of the curved pipe object, based on the grip editing input.

6. The method of claim 1, wherein generating a display representation of the curved pipe object comprises generating 2D line work representing the geometry of the curved pipe object in a plan view.

7. The method of claim 1, wherein generating a display representation of the curved pipe object comprises generating 2D line work representing a beginning and ending elevation of the curved pipe object in a profile view.

8. The method of claim 1, wherein generating a display representation of the curved pipe object comprises sweeping a cross-sectional shape of the curved pipe object along a helical path determined from the 3D helix parameters representing the geometry of the curved pipe object in an isometric view.

9. A computer-readable storage medium storing instructions for generating a curved pipe object in a computer-aided design (CAD) drawing, wherein execution of the instructions by a computing device causes the computing device to perform the steps of:
   receiving a user selection of one of a plurality of a curved pipe creation methods, wherein each curved pipe creation method allows the user to specify one or more parameters for characterizing the geometry of the curved pipe object;
   based on the selected curved pipe creation method, prompting the user to specify geometric attributes of the curved pipe object to be generated;
   from the geometric attributes of the curved pipe object, determining a collection of 3D helix parameters that represent the geometry of the curved pipe object in a 3D coordinate system; and
   generating a display representation of the curved pipe object using the 3D helix parameters in the CAD drawing.

10. The computer-readable storage medium of claim 9, wherein the curved pipe creation method is a three-points method, and wherein the geometric attributes comprise a beginning coordinate, an ending coordinate, and an arc coordinate for the curved pipe object to be generated.

11. The computer-readable storage medium of claim 9, wherein the curved pipe creation method is a radius, start point, and endpoint method, and wherein the geometric attributes comprise a beginning coordinate, an ending coordinate, and a radius length for the curved pipe object to be generated.

12. The computer-readable storage medium of claim 9, wherein the curved pipe creation method is a tangent to last pipe and endpoint method, and wherein the geometric attributes comprise an endpoint coordinate of a pipe object in the CAD drawing and an endpoint coordinate.

13. The computer-readable storage medium medium of claim 9, wherein the steps further comprise:
   enabling at least one grip associated with the curved pipe object;
   receiving a grip editing input from the user;
   generating a modified display representation of the curved pipe object;
   updating the 3D helix parameters representing the geometry of the curved pipe object, based on the grip editing input.

14. The computer-readable storage medium of claim 9, wherein generating a display representation of the curved pipe object comprises generating 2D line work representing the geometry of the curved pipe object in a plan view.

15. The computer-readable storage medium of claim 9, wherein generating a display representation of the curved pipe object comprises generating 2D line work representing a beginning and ending elevation of the curved pipe object in a profile view.

16. The computer-readable storage medium of claim 9, wherein generating a display representation of the curved pipe object comprises sweeping a cross-sectional shape of the curved pipe object along a helical path determined from the 3D helix parameters representing the geometry of the curved pipe object in an isometric view.

17. A computing device comprising:
   a processor; and
   a memory configured to store an application that includes instructions which, when executed by the processor, cause the processor to perform operations for generating a curved pipe object in a computer-aided design (CAD) drawing, including the steps of:
   receiving a user selection of one of a plurality of a curved pipe creation methods, wherein each curved pipe creation method allows the user to specify one or more parameters for characterizing the geometry of the curved pipe object;
   based on the selected curved pipe creation method, prompting the user to specify geometric attributes of the curved pipe object to be generated;
   from the geometric attributes of the curved pipe object, determining a collection of 3D helix parameters that represent the geometry of the curved pipe object in a 3D coordinate system; and
   generating a display representation of the curved pipe object using the 3D helix parameters in the CAD drawing.

18. The computing device of claim 17, wherein the curved pipe creation method is a three-points method, and wherein the geometric attributes comprise a beginning coordinate, an ending coordinate, and an arc coordinate for the curved pipe object to be generated.

19. The computing device of claim 17, wherein the curved pipe creation method is a radius, start point, and endpoint method, and wherein the geometric attributes comprise a beginning coordinate, an ending coordinate, and a radius length for the curved pipe object to be generated.

20. The computing device of claim 17, wherein the curved pipe creation method is a tangent to last pipe and endpoint method, and wherein the geometric attributes comprise an endpoint coordinate of a pipe object in the CAD drawing and an endpoint coordinate.

21. The computing device of claim 17, wherein the steps further comprise:
   enabling at least one grip associated with the curved pipe object;
   receiving a grip editing input from the user;
   generating a modified display representation of the curved pipe object; and
   updating the 3D helix parameters representing the geometry of the curved pipe object, based on the grip editing input.

22. The computing device of claim 17, wherein generating a display representation of the curved pipe object comprises generating 2D line work representing the geometry of the curved pipe object in a plan view.

23. The computing device of claim 17, wherein generating a display representation of the curved pipe object comprises generating 2D line work representing a beginning and ending elevation of the curved pipe object in a profile view.

24. The computing device of claim 17, wherein generating a display representation of the curved pipe object comprises sweeping a cross-sectional shape of the curved pipe object along a helical path determined from the 3D helix parameters representing the geometry of the curved pipe object in an isometric view.

* * * * *

UNITED STATES PATENT AND TRADEMARK OFFICE
CERTIFICATE OF CORRECTION

PATENT NO.        : 7,518,606 B2
APPLICATION NO.   : 11/278654
DATED             : April 14, 2009
INVENTOR(S)       : Connor et al.

Page 1 of 1

It is certified that error appears in the above-identified patent and that said Letters Patent is hereby corrected as shown below:

In column 9, line 47, please replace "storage medium medium of" with -- storage medium of --.

Signed and Sealed this

Eighth Day of September, 2009

David J. Kappos
*Director of the United States Patent and Trademark Office*